United States Patent [19]

Muller et al.

[11] Patent Number: 4,478,431
[45] Date of Patent: Oct. 23, 1984

[54] SUSPENSION SYSTEM FOR VEHICLES

[75] Inventors: Rudi Muller, Egenhofen; Axel Pauly, Isenbuttel, both of Fed. Rep. of Germany

[73] Assignee: Bayerische Motoren Werke Aktiengesellschaft, Fed. Rep. of Germany

[21] Appl. No.: 324,668

[22] Filed: Nov. 24, 1981

[30] Foreign Application Priority Data

Nov. 25, 1980 [DE] Fed. Rep. of Germany ....... 3044287

[51] Int. Cl.$^3$ ............................................. B60G 11/26
[52] U.S. Cl. ................................... 280/710; 280/708; 280/714; 267/64.25
[58] Field of Search ............... 280/698, 702, 708, 710, 280/712, 714; 267/64.25, 64.15 (U.S. only), 64.19 (U.S. only), 64.23 (U.S. only)

[56] References Cited

U.S. PATENT DOCUMENTS

| | | | |
|---|---|---|---|
| 3,077,345 | 2/1963 | Andersson et al. | 267/64.25 |
| 3,112,923 | 12/1963 | Ley | 280/708 |
| 3,168,302 | 2/1965 | Burris | 267/64.25 |
| 3,264,008 | 8/1966 | Allinquant | 280/708 |
| 3,304,076 | 2/1967 | Doversberger | 267/64.25 |
| 3,499,639 | 3/1970 | Bonnotte | 267/64.23 |
| 3,536,311 | 10/1970 | Capgras | 267/64.25 |
| 4,153,237 | 5/1979 | Supalla | 267/64.15 |
| 4,278,272 | 7/1981 | Leibeling | 280/708 |

Primary Examiner—David A. Scherbel
Assistant Examiner—Dennis H. Pedder
Attorney, Agent, or Firm—Craig & Burns

[57] ABSTRACT

A suspension for a vehicle includes a displacer which can be actuated by the relative motions between a vehicle wheel and the vehicle body. The displacer includes a working space or chamber containing a flow medium connected by at least one throttle to one of at least two springs which can be loaded by the flow medium. The two springs have different load-dependent spring rate changes whereby the distribution of the volume proportions of flow medium displaced to the springs differs depending on the static flow medium pressure. At least one throttle which operates as a function of load is placed in front of the less progressive spring.

29 Claims, 13 Drawing Figures $$\left(\frac{\Delta V_1}{\Delta V_2}\right)_a > \left(\frac{\Delta V_1}{\Delta V_2}\right)_b$$

FIG.2
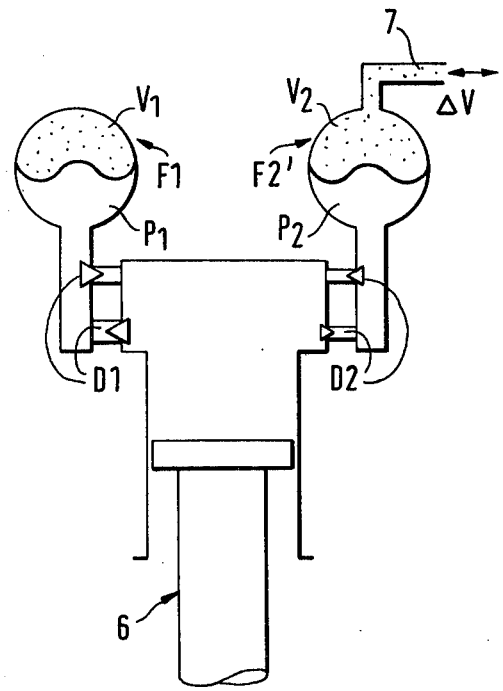
FIG.2A
FIG.2B
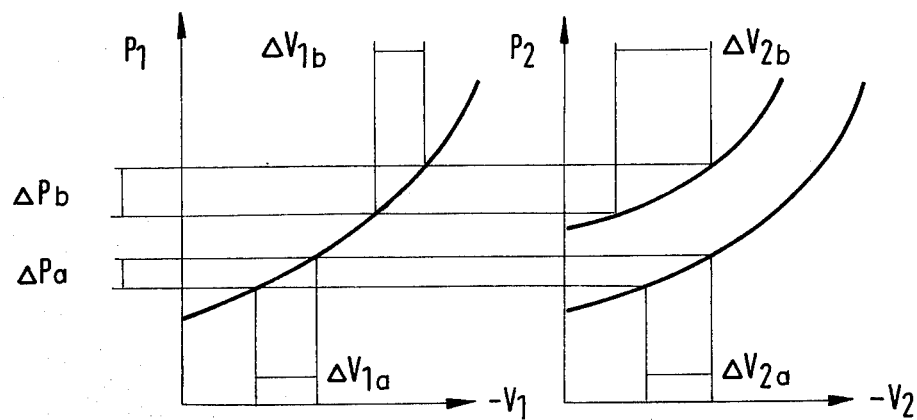
$$\left(\frac{\Delta V_1}{\Delta V_2}\right)_a > \left(\frac{\Delta V_1}{\Delta V_2}\right)_b$$

SUSPENSION SYSTEM FOR VEHICLES

BACKGROUND OF THE INVENTION

The present invention is directed to a suspension system for a vehicle comprising displacer means which can be actuated by the relative motions between a vehicle wheel and the vehicle body, the working space of the displacer means containing a flow medium and being connected by at least one throttle means to at least two spring means which can be loaded by the flow medium.

Conventional versions of such suspensions as shown in German Auslegeschrift (hereinafter DE-AS) No. 1,430,836 or German Offenlegungschrift (hereinafter DE-OS) No. 1,655,029, feature two spring means apiece in the form of hydropneumatic springs which are connected to a displacer means. With these systems, the problem of damping of the vehicle body, increases considerably with loading of the vehicle and is not satisfactorily solved in that the damping of the wheels is not as uniform as possible with changing vehicle loads.

In suspension systems of the aforementioned type with, for example, two hydropneumatic springs per vehicle wheel, a proportionally uniform relative change of volume corresponds to any static pressure change $\Delta P_{static}$ in any spring because of the formula $p \times v = $ constant, which is generally a valid statement. However, this means that the ratio of the sub-volume flows displaced by the displacer means to the two springs is always the same:

$$P_a \cdot V_{1a} = P_b \cdot V_{1b};$$

$$P_a \cdot V_{2a} = P_b \cdot V_{2b};$$

$$\frac{P_a}{P_b} = \frac{V_{1b}}{V_{1a}} = \frac{V_{2b}}{V_{2a}};$$

$$\frac{V_{1b}}{V_{2b}} = \frac{V_{1a}}{V_{2a}}.$$

Here the indices "a" stand for empty, "b" for loaded and "1" for the gas volume of the first spring and "2" for the gas volume of the second spring. From the above-explained relationships, it follows that throttles which are placed in front of one or both springs will always make the same proportional contributions to the overall damping of the system. Therefore, a load-dependent change in damping cannot be achieved.

With suspension and damping systems for motor vehicles of the type referred to above, it has been necessary up till now to strike compromises in the damping of the suspension, as in the use of a mechanical suspension together with conventional shock absorbers. If the damping is tailored to an average vehicle load, then it will be preceived as too hard at small loads and too soft when large additional loads are imposed.

If in the determination of the damping characteristic, even greater emphasis is placed on the fundamental (natural) frequency of the wheel, which lies at approximately 12 Hz, there exists the danger that adequate damping will be completely impossible in the range of the body's fundamental (natural) frequency of approximately 1.2 Hz. This means, for example, that in addition to special comfort adjustments, sports adjustments, i.e., a firm yet positive suspension, must also be offered.

Many attempts to vary damping approximately as a function of load, travel or even frequency have already been undertaken.

In the case of travel-dependent damping variations, a larger number of throttle openings can be cleared or covered with, for example, an adjusting piston. The suspension system disclosed in DE-OS 2,655,705 creates a way of bringing additional auxiliary damping pistons into play beyond a certain rebound or compression travel. In Austin vehicles provision is made for a travel-dependent change in the displacer surface, while a change in displacer speed brought about by a change in the transmission ratio between wheel stroke and damper stroke has already been proposed as well. Travel-dependent dampers have the disadvantage that in the case of level-controlled vehicles the damping force does not increase with load since the vehicle height or clearance remains constant.

Damping in hydropneumatic suspensions which is variable as a function of pneumatic spring pressure is also known as evidenced by DE-OS Nos. 1,555,382 or 1,555,383, but all of these solutions require expensive control devices which are susceptible to malfunction because of the danger of fouling and wear. In these devices the positioning or control element in its turn must be damped to avoid uncontrolled switching transients. This again leads to greater temperature dependency.

Finally, frequency-dependent changes in the throttle cross-sections have also been proposed as indicated in DE-AS 1,045,256 or DE-OS No. 1,555,491. The frequency-sensitive inertial masses used therein give rise, on an even larger scale, to the above-mentioned disadvantage of a great temperature dependency since particularly strong inherent damping of the positioning elements is required because of the rapid pressure pulsations.

In addition, German Patentschrift No. 1,675,634 or DE-OS No. 3,406,835 show a pneumatic spring and damper system, the operation of which is load-dependent and frequency-dependent, but in both very large quantities of air are needed, by comparison, in order to be able to achieve adequate damping. Even at relatively low displacement speeds, the damper forces decrease significantly and the overall spring rate is significantly increased. This causes a rapid rise in the body frequency.

German DE-OS No. 2,017,098, shows a hydropneumatic suspension system with automatic leakage readjustment in which the oil chamber of the displacer is connected to two gas volumes, i.e., the actual pneumatic spring volume and the adjustment gas volume of an adjustment element. A throttle is also placed in front of the adjustment element in this case (FIG. 5), but this throttle is placed in front of the more progressive spring of the two springs if it is (theoretically) assumed that the adjustment element is to assume a significant portion of the spring work at all. However, this is not the case according to the description found in this document. This throttle is undesirable, however, in that it becomes less and less effective as the load on the system increased.

SUMMARY AND OBJECTS OF THE INVENTION

An object of the present invention is to provide a vehicle suspension system of the aforementioned type with which damping rises in a particularly simple fashion continually as the load on the system increases.

A further object of the invention is to provide a suspension system wherein it is possible to vary the damping as a function of frequency.

These and other objects of the invention are attained by providing a suspension system of the type referred to above, wherein the two spring means have different load-dependent spring rate changes whereby the distribution of the volume proportions of flow medium displaced to the springs means differs depending on the static flow medium pressure, and in that at least one throttle means which operates as a function of load is placed in front of the less progressive spring means.

Thus, for instance at low load, i.e., low flow medium pressure, the first spring means can be comparatively softer than the second, and therefore at this load the proportion of the flow medium displaced to this softer spring means will be larger than the proportion of the flow medium displaced to the second spring means. The throttle means placed in front of the second spring means will therefore generate less damping force because of the reduced volume proportion flowing through it. If the above-mentioned first spring means (for instance, a hydropneumatic spring with a constant gas mass) has a significantly higher spring rate at higher load than, for instance, the above-mentioned second spring means, then at this higher load a significantly larger proportion of the displaced volume will flow to the second, now relatively "softer", spring means. Therefore, the throttle means placed in front of the second spring means will generate more damping force. Thus, with the vehicle subjected to greater load in the way intended by the invention, the throttle means exerts a higher damping force than at low load, whereby the damping force transitions take place smoothly in an infinitely variable fashion.

The above-described basic features of the invention can be implemented in a large number of designs or embodiments. In one disclosed embodiment of the invention the two spring means of the suspension system are hydropneumatic springs. One of the hydropneumatic springs is a diaphragm-type hydraulic accumulator and the other is a floating-piston accumulator wherein the floating piston is connected to a mechanical auxiliary spring. The mechanical auxiliary spring is a compression spring situated in a gas volume of the floating-piston accumulator.

In the suspension system wherein the two spring means are hydropneumatic springs, the amount of gas contained in one of the two hydropneumatic springs can be varied as by connecting it to a level control. A throttle means is provided in front of the hydropneumatic spring which can have the amount of gas, and accordingly the pressure, varied therein, this throttle means thus providing a higher damping rate than that of the other hydropneumatic spring.

According to another embodiment of the present invention, the two spring means are each connected to a chamber of a two-chamber piston displacer means. At least one throttle means is provided in the piston of the piston displacer means. One spring means is a hydropneumatic spring and the second spring means is a floating-piston accumulator with a mechanical spring. Another throttle means is positioned in front of the floating-piston accumulator. The mechanical spring is integrated into the piston displacer and abuts against one end of the cylinder with its other end against a separating piston which defines a working space. Between the separating piston and the piston of the piston displacer, there is a tension stop spring. A stop ring is provided between the separation piston and the piston of the piston displacer, the stop ring being attached at the piston rod and acting on the separating piston or the tension stop ring beyond a certain rebound travel.

An additional embodiment of the invention includes two first spring means for respective wheels of a vehicle axle and a second spring means which is connected in common to these first spring means. A throttle means is located at the input of the common second spring means. Individual lines for the fluid medium lead from respective displacer means to the common second spring means and the lines each include a throttle means. In one form of this embodiment, the common spring means is a floating-piston accumulator, the piston of which can be displaced in opposition to the effect of a mechanical spring provided therein.

These and other objects, features and advantages of the present invention will become more apparent from the following description when taken in connection with the accompanying drawings which show, for purposes of illustration only, several embodiments in accordance with the present invention and wherein:

BRIEF DESCRIPTION OF THE DRAWINGS

FIG. 2 is another embodiment of the suspension system of the invention;

FIGS. 2a and 2b show spring characteristics of the springs shown in FIG. 2;

DESCRIPTION OF THE PREFERRED EMBODIMENT

Figure 1:
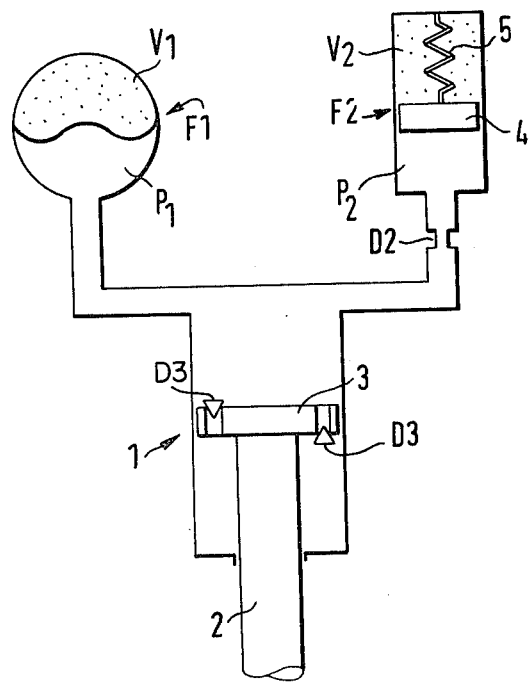
FIG. 1 shows a schematic diagram of one embodiment of the suspension system according to the present invention.

With the suspension shown in FIG. 1, damping can be achieved which can be varied primarily as a function of load. The suspension includes a displacer constructed as a damper in which the piston assembly, which includes piston 3 and piston rod 2, serves as the actual displacer. Included in piston 3 is a bidirectional throttle D3 which provides the basic damping. Throttle D3 can consist of spring-loaded valves which may be constantly open and which are designed to be large enough that adequate body damping and wheel damping is ensured with the vehicle empty.

Springs F1 and F2 are separate but connected in series with respect to spring action. This means that the volume of oil displaced by piston assembly upon compression is divided into two volume flows, of which one is sent to spring F1 and the other to spring F2. In the example shown here, a throttle D2 is positioned in front of spring F2, i.e., between spring F2 and displacer 1. This throttle takes over the task of additional body damping at higher loads. The two springs F1 and F2 are hydropneumatic springs. Spring F1 is a diaphragm-type hydraulic accumulator and spring F2 is a floating-piston accumulator and both springs have constant gas masses. Piston 4 of spring F2 is connected to a mechanical auxiliary spring 5 which is positioned in the gas volume of the floating-piston accumulator and functions as a compression spring. With auxiliary spring 5, the characteristic of spring F2 is "linearized", as a comparison of FIGS. 1a and 1b will show.

Figures 1A, 1B:
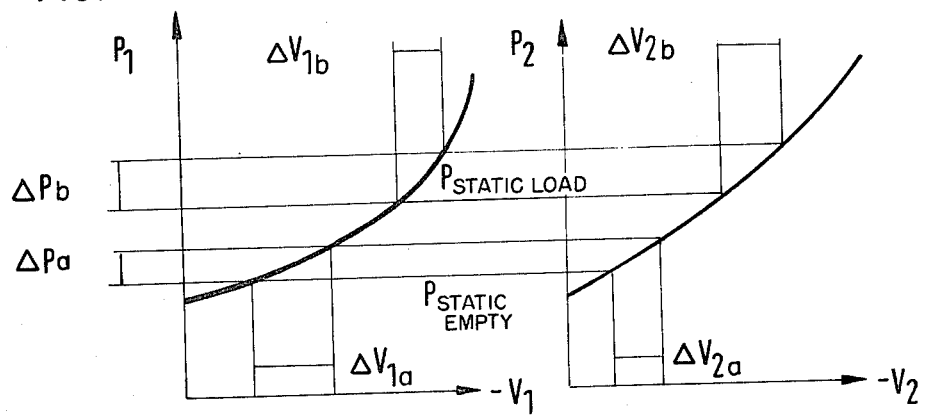
FIGS. 1a and 1b show typical spring characteristics of the two springs shown in FIG. 1.

In FIG. 1a the typical characteristic variation of a pneumatic spring is shown. It has a comparatively smooth variation at low load ($P_{static\ empty}$) but as load increases ($P_{static\ empty}$) it very quickly becomes steep. In this figure, change in pressure is indicated as $\Delta P$ and change in volume as $\Delta V$. The subscripts or indices 1 and 2 indicate the volumes for the first and second spring means, respectively. The subscript or indices a and b indicate the empty or loaded condition of the particular spring means, respectively.

The characteristic variation of spring F2 shown in FIG. 1b is steeper at low loads than the corresponding variation of spring F1 (FIG. 1a), but because of the "linearization" it is a flatter at high loads than that of spring F1. At a low static pressure ($P_{static\ empty}$) spring F1 will absorb a larger portion than spring F2 of the volume flow displaced by the piston assembly ($V_1$ is greater than $V_2$). As static pressure increases, proportion of $V_2$ rises since spring F2 is the less progressive spring. Accordingly, more oil will flow through throttle D2. This means that body damping, which increases continuously with load, can be achieved. At higher displacement rates, this load-dependent damping effect is further amplified by the flow resistance of throttle D2 and the inertial resistance of piston 4 of spring F2.

In the case of the suspension design shown schematically in FIG. 2, the displacer is a simple plunger piston 6. Throttles D1 and D2 situated in front of springs F1 and F2', i.e., between spring F1 and F2' and the displacer, take over the task of basic damping. Of these two throttles, D2 has the greater flow resistance and determines the additional body damping.

The characteristics of springs F1 and F2' in this embodiment includes spring F1 as a spring with a constant or predetermined amount of gas contained therein and spring F2' as a spring with a variable amount of gas contained therein. It is a good idea for the gas volume, and accordingly the gas pressure, of spring F2' to be connected to a level control as indicated in FIG. 2 by line 7.

FIG. 2a shows the behavior of the characteristic of spring F1, while in FIG. 2b the lower curve would be the variation of the characteristic of spring F2' if it were not level-controlled. The upper curve indicates the characteristic of spring F2' at higher loads.

FIGS. 2a and 2b indicate that spring F1 becomes harder as load increases, while spring F2', on the other hand, becomes relatively softer as indicated by the increased curvature of the plotted line. Specifically the level control feeds to spring F2' a quantity of gas to compensate for the reduction in volume caused by the compression of the two springs F1 and F2'. This makes F2' even softer than, for example, an individual spring with a constant gas volume, because of the controlled gas pressure and gas volume.

With the embodiment as shown in FIG. 2, a different distribution of the volume flows, as a function of load, is also obtained. Here, because of the comparatively greater softness of spring F2', the damping of the body rises even faster over load than in the case of the embodiment according to FIG. 1 when the other parameters are kept constant.

Figure 3:
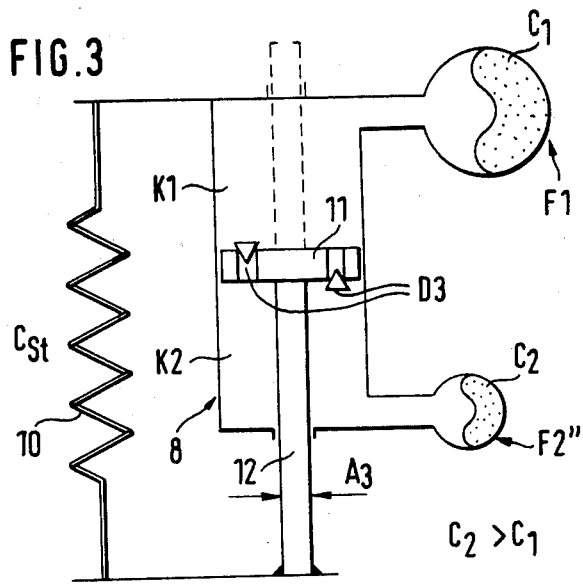
FIGS. 3 and 4 show other embodiments of the suspension system according to the invention.
Figure 4:
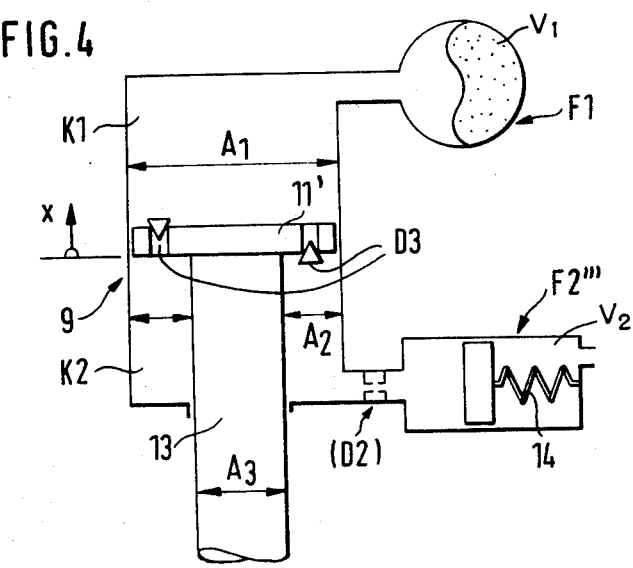

FIGS. 3 and 4 show alternate embodiments in which springs F1 and F2'' and spring F1 and F2''' are hydraulically connected in parallel. Spring F1 is connected to chamber K1 and spring F2'' or F2''' to chamber K2 of a two-chamber piston displacer.

The configuration shown in FIG. 3 is mainly suited for adapting the damping force to the frequency of the relative motion between the wheel and the vehicle body. The hydro-pneumatic suspension is connected in parallel to a steel spring 10, and the two pneumatic springs F1 and F2'' have different spring rates due to the fact that $c_2$ is greater than $c_1$.

The hard spring F2'' serves primarily to support and react the damper forces generated via throttle D3 in the piston of the shock adsorber, while the other softer spring F1 determines the suspension comfort and the fundamental (natural) frequencies together with steel spring 10.

At low piston speeds and thus low damper forces, the oil located in the cylinder is largely forced from chamber K1 into chamber K2 through throttle D3 in piston 11, and the oil displaced by the piston rod 12 is mainly received by the softer spring F1. As piston speed increases, the pressure differential at throttle D3 increases, as does that portion of the oil which is conveyed by piston 11 from spring F2'' into spring F1. In the limiting case, where flow resistance approaches infinity, piston 11 acts as a pure displacer which pushes the entire cylinder volume back and forth between the two springs F1 and F2''. The two springs F1 and F2'' then shift from their initial series connection to a parallel connection, and this hardens the overall spring effect as $V_{ctotal}=c_1+c_2$ but brings the damping force to a value of zero. At high displacer speeds in the region of the wheel frequency, hard shocks, which in conventional-design dampers can only be softened by additional series-connected rubber elements, are thus eliminated. The higher the proportion supported by steel spring 10, the smaller the piston rod area can be made and thus the smaller the static pressure differences during compression and rebound which influence the spring forces and thus the damping. If, as indicated in FIG. 3, by dotted lines, the piston rod were also to lead through chamber K1, absolutely no further static pressure differences would occur and the damping would be only frequency-dependent.

The suspension shown in FIG. 4 has a damping force dependency on frequency which is similar to that of FIG. 3 and to this a dependency on load is also added. The suspension supports the full load of the vehicle, and therefore, the cross-section of piston rod 13 is designed to be relatively large. The hydropneumatic spring F1 is connected to the side of piston displacer 9 adjacent the end without the piston rod. A floating-piston accumulator with a purely mechanical spring 14 is connected to chamber K2, i.e., the piston rod side of the piston of displacer 9. Spring F2''' has a strictly linear characteristic since the chamber in which spring 14 is situated is bled to the atmosphere.

In the case of low displacer speeds, approximately in the region of the body's fundamental natural frequency, the procedure is largely the same as with the suspension according to FIG. 1, namely, at a low static pressure, the oil volume displaced by piston rod 13 is delivered to spring F1 which is softer at this pressure, $V_1$ is greater than $V_2$. As static pressure increases, the spring rate of F1 increases, while the spring rate of $F2'''$ remains constant. This steadily decreases the proportion of $V_1$ as compared to $V_2$. The damping force behavior can be explained using the example of the following limiting cases:

$V_1 >> V_2$: With a very soft spring F1, virtually no oil is delivered to spring $F2'''$. Therefore, the throttle volume flow through piston valve D3, referred to as $V_{D3}$, is equal to the displacer speed times the annular surface, i.e., $V_{D3}$ empty $= A_2 x$. Here x is the displacer speed, and $A_2$ is the annular surface between the cylinder and the piston rod (represented as $A_1 - A_3 = A_2$).

$V_1 << V_2$: With a high static pressure, spring F1 is hardly in a position to dynamically compress any further, and therefore, the throttle volume increases to $V_{D3\ load} = A_1 x$. The displacer surface area which is effective for the damping volume has thus increased from the annular surface $A_2$ to the cylindrical surface $A_1$; this causes the damping force to increase in the same ratio. If need be, the increase in damping force can be amplified by a throttle $D_2$ situated in front of spring $F2'''$ which thus becomes increasingly effective at higher pressures.

At higher displacer speeds, approximately in the range of the wheel frequencies, the dynamic pressure differences, because of the larger pressure drop at throttle D3, will overlap the static pressure increase. As in the previous example, the effect of this will be that the throughput through throttle D3 will decrease and thus springs F1 and $F2'''$ will be activated more intensely. In the limiting case where flow resistance approaches infinity, the piston 11 will again act as a pure displacer which will push the total cylinder volume back and forth between springs F1 and $F2'''$, which would then be considered to be connected in parallel.

Figure 5:
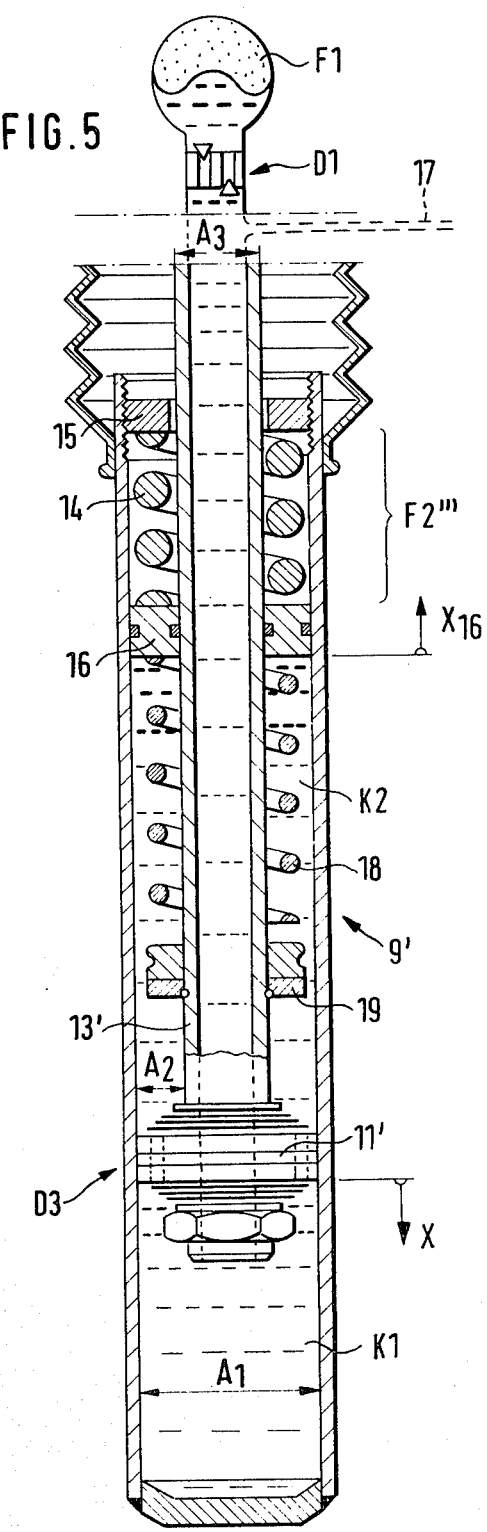
FIG. 5 shows a technical implementation of the principle outlined in FIG. 4.

FIG. 5 shows a technical implementation of the suspension principle depicted more schematically in FIG. 4. Here mechanical spring 14 is integrated into the piston displacer 9' and engages a cylinder cover 15 at one end and a separating piston 16 with its other end which is adjacent to the piston rod-side of the piston assembly. This working volume established by the piston, cylinder and cover, corresponds to chamber K2 of the depiction shown in FIG. 4. Below piston 11' is chamber K1 which is connected via hollow piston rod 13' to hydropneumatic spring F1, in front of which additional throttles D1 are positioned. In front of throttle D1, the connection 17 for a level control is also indicated.

Between separating piston 16 and piston 11' is a tension stop spring 18 (not shown in FIG. 4), which can also be designed to be progressive.

The integration of spring 14 into displacer 9' in the way described above offers the advantage, in comparison with the schematic diagram shown in FIG. 4, that in addition to the hydraulic loading of spring $F2'''$ this spring can also be actuated by piston 11' or piston rod 13' so that other possible variations are created both in the selection of the damping force behavior and the spring force behavior. The tension stop spring actuated via stop ring 19 in this embodiment has a load-dependent operating point since it is attached to separating piston 16, which can be shifted as a function of load.

Figure 6:
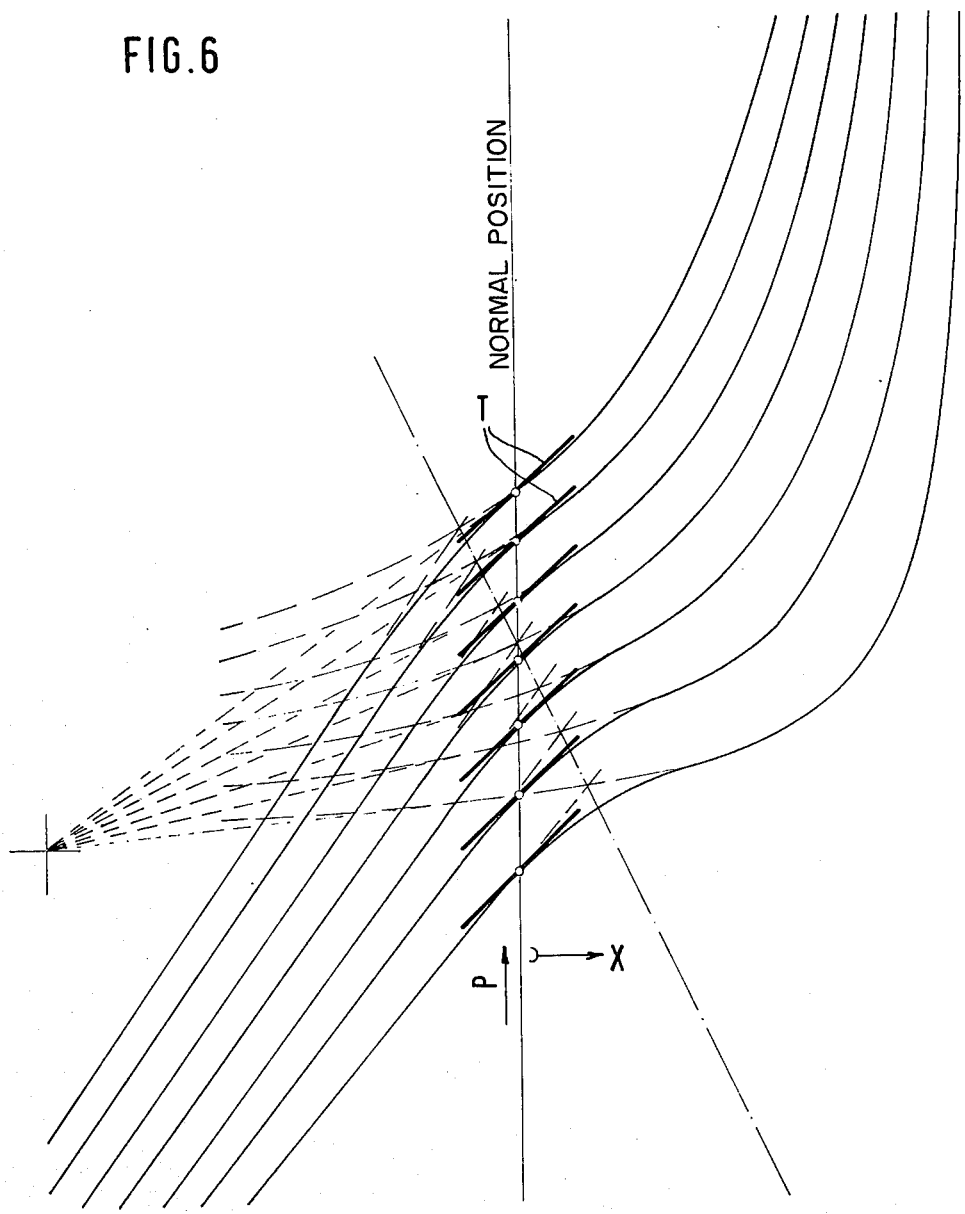
FIG. 6 shows characteristics of the suspension in accordance with FIG. 5 when this suspension is used with a level control.

FIG. 6 shows a family of characteristics which are possible with the suspension and damping system as shown in FIG. 5 in connection with a level control.

The more heavily the vehicle is loaded (top curves in curve family), i.e., the more spring 14 and thus separating piston 16 are compressed, the later the tension stop spring 18 actuates, as FIG. 6 shows. In addition, it is also seen here that the spring characteristics all have the same slope (tangent T) around the normal position. The progressiveness of hydropneumatic spring F1 is again compensated for by the load-dependent operating point of tension stop spring 18.

Depending on the design of steel spring 14 which determines the variation of the tension stop spring's operation and thus the locations of the dotted straight lines, for example, a constant fundamental natural frequency variation over load can be achieved. Otherwise, this can only be achieved with parallel-connected steel and pneumatic springs.

Instead of the tension stop spring 18 which is shown in the practical example according to FIG. 5 and which is, if need be, progressive, a spring which is made of polyurethane or of similar rubber-elastic materials and which rests on stop ring 19 can be used.

In addition to the spring rate variation, the damping force variation is also affected as a function of load by the tension stop spring 18. In particular, as soon as tension stop spring 18 actuates, it changes the speed of separating piston 16 referred to as $x_{16}$, and thus also the damping force of throttle D3 of piston 11' since this speed is a function of the differential speed between piston 11' and separating piston 16. Accordingly, the relationships are $V_{D3} = A_2(X - X_{16})$. In the extreme case, with tension stop spring on the stop ring 19, the damping force of throttle D3 drops to zero since piston 11' and separating piston 16 move at the same speed. Throttle D1 then ensures adequate fundamental damping (FIG. 5). It is also possible to eliminate tension stop spring 18 entirely. In this case stop ring 19, with a corresponding kink in the overall spring configuration strikes against separating piston 16 beyond a certain displacer travel and then carries piston 16 along with it.

The additional load-dependent damping effect, load-dependent change in damper speed, x, is superposed on the effect of the system according to FIG. 4 with the load-dependent increase in displacer surface area from $A_2$ to $A_1$ and the load dependency of the damping force is thus further amplified.

Therefore, a type of load-dependent damping which relies solely on this effect is also conceivable without the effect illustrated by FIG. 4 which required different spring rate variations overload, expressed by the relationships $dc_1/dx$ and $dc_2'''/dx$. The pneumatic spring as shown in FIG. 4 could be replaced by, for instance a steel spring $F1'$. However, this would yield an unfavorable degressive overall spring rate. Although in that case both springs $F1'$ and $F2'''$ have the same spring rate variation, and this embodiment falls within the framework of the basic theory of the invention. In particular, the tension stop springs 18 correct the effect of spring $F2'''$ (both act on separating piston 16) on the hydraulic system as if $F2'''$ had a load-dependent (degressive) characteristic variation and were very hard when empty but normal when loaded. In this case, with the vehicle empty the following is true $V_{D3} = 0$, or $C_{total}C_1' + C_2'''$, while when there is a major load, the following is true:

$$V_{D3} = A_2(X - X_{16}) \text{ or } \frac{1}{C_{total}} = \frac{1}{C_1'} + \frac{1}{C_2'''}.$$

Accordingly, the differing allocation of medium flow to the one or more springs of the overall suspension system can be achieved by means of different spring rate variations. For instance, one spring with a progressive characteristic may be included and another with a linear characteristic. Also contemplated is the connecting of these springs differently, for instance, connecting them in parallel when the vehicle is empty and in series when it is loaded.

Figure 7:
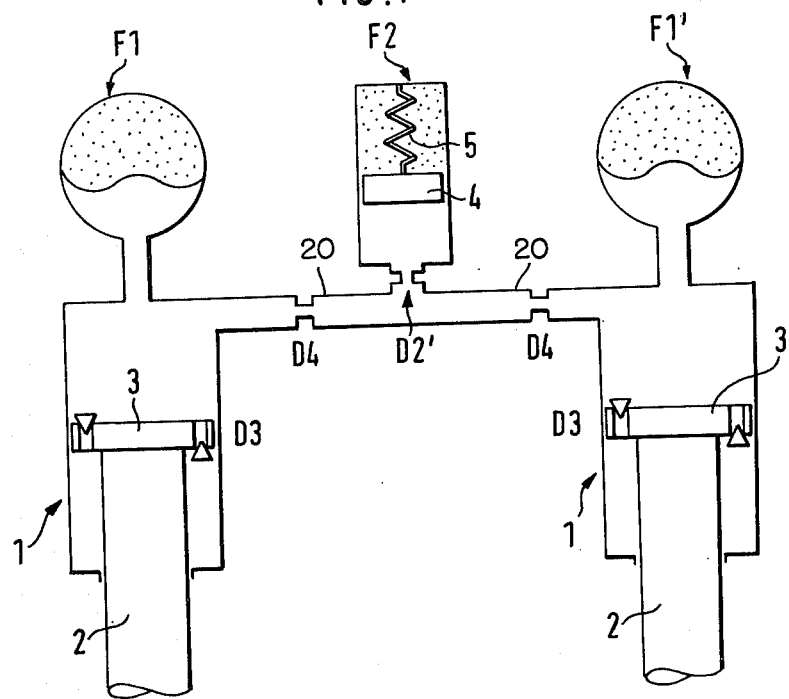
FIG. 7 shows an implementation of the suspension system of the invention for wheels or wheel pairs on a vehicle axle.

As is clear from the more schematic depiction in FIG. 7 of a refinement of the invention, in each case one spring F1 or F1' of a wheel or wheel pair of a vehicle axle can be connected to a second spring F2 which is common to these two springs F1 and F1'. As in the case of the embodiment according to FIG. 1, the common spring F2 is a floating-piston accumulator which is reinforced and thus linearized in the gas volume by a spring 5. The additional load-dependent body damping can be ensured by a throttle D2' which is provided at the input to the common spring F2. However, it is also possible to install one throttle D4 apiece into each separate line 20 which leads from separate displacers 1 to the common second spring F2. In one case, the body damping would take effect only during wheel motions in the same vertical direction, while when there are wheel motions in opposite vertical directions the oil is forced unthrottled from one side to the other. In a second case, additional body damping is provided during wheel motion in the same vertical direction and in different vertical directions. This allows additional damping of rolling, e.g., when one wheel moves upwardly relative to the vehicle body and the opposite wheel moves downwardly, along with additional damping when there is additional lift, e.g., when the suspension is loaded.

Figure 7A:
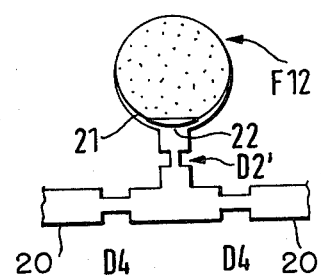
FIGS. 7a and 7b show other forms of the suspension depicted schematically in FIG. 7.

Instead of the floating-piston accumulator shown in FIG. 7 for the second spring F2 which is common to both wheels, this common spring F12, as shown in FIG. 7a, can also be a diaphragm-type hydraulic accumulator. Here, at low operating pressures the diaphragm 21 can rest on the inlet opening 22 of the diaphragm-type hydraulic accumulator. Spring F12 goes into operation only if its filling pressure is exceeded by the system pressure. This version thus has the disadvantage that the spring-force and damping-force variations change irregularly.

Figure 7B:
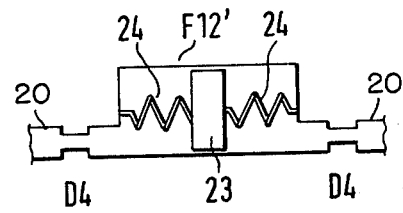

According to FIG. 7b, the common spring F12' can also be a cylinder/piston unit. In this case piston 23 is centered by two mechanical springs 24 acting on the ends of the cylinder. The flow medium chambers formed on both sides of piston 23 are respectively allocated to a respective displacer 1, end being associated with one of the two wheels of an axle as shown in the implementation according to FIG. 7.

The version according to FIG. 7b allows no additional lift damping, but rather makes additional damping of rolling possible in connection with a roll spring rate which is softer than the lift spring rate since piston 23 is moved from its center position in opposition to the force of springs 24 only when the wheel movements are in opposite vertical directions While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A suspension system for a vehicle comprising displacer means responsive to the relative motions between a vehicle wheel and the vehicle body, said displacer means including means for containing a flow medium, at least two spring means connected to said means for containing a flow medium which can be loaded by said flow medium, said at least two spring means being continuously responsive to flow of said flow medium, one of said at least two spring means being less progressive than the other of said at least two spring means, at least one throttle means for continuously controlling the movement of flow medium into said one of said at least two spring means, said at least two spring means having different load-dependent spring rate changes whereby the distribution of the volume proportions of flow medium displaced to each of the spring means differs depending on the static flow medium pressure and whereby said at least one throttle means is disposed in front of said less progressive spring means and operates as a function of load.

2. A suspension system according to claim 1, wherein the at least two spring means are connected in series.

3. A suspension system according to claim 2, wherein the displacer means includes a piston, said piston including at least one throttle means therein.

4. A suspension system according to claim 1, wherein the displacer means is a piston, said piston including at least one throttle means therein.

5. A suspension system according to claim 1, 2, 3, or 4, wherein the at least two spring means are hydropneumatic springs.

6. A suspension system according to claim 5, wherein one of said hydropneumatic springs is a diaphragm-type hydraulic accumulator and another is a floating-piston accumulator wherein the floating piston is connected to a mechanical auxiliary spring.

7. A suspension system according to claim 6, wherein the mechanical auxiliary spring is a compression spring situated in a gas volume of the floating piston accumulator.

8. A suspension spring according to claim 5, wherein the gas pressure of one of the two hydropneumatic springs can be varied.

9. A suspension system according to claim 8, wherein the gas pressure of one of the hydropneumatic springs can be varied by connection to a level control.

10. A suspension system according to claim 9, wherein there is a throttle means disposed in front of the hydropneumatic spring which can have the gas pressure varied therein, this throttle means having a higher damping rate than that of the other hydropneumatic spring.

11. A suspension system according to claim 1 or 2, wherein the displacer means is a plunger piston.

12. A suspension system according to claim 1, wherein the at least two springs means are each connected to a chamber of a two-chamber piston displacer means.

13. A suspension system according to claim 12, wherein there is at least one throttle means in the piston of said piston displacer means.

14. A suspension system according to claim 13, wherein one of said at least two spring means is a hydropneumatic spring and another of said at least two spring means is a floating-piston accumulator with a mechanical spring.

15. A suspension system according to claim 13, wherein another throttle means is disposed in front of the floating-piston accumulator.

16. A suspension system according to claim 13, wherein a mechanical spring is integrated into the piston displacer and rests at one end at a cylinder cover and at its other end on a separating piston which is adjacent to a piston rod-side working space.

17. A suspension system according to claim 12, wherein one of said at least two spring means is a hydropneumatic spring and another of said at least two spring means is a floating-piston accumulator with a mechanical spring.

18. A suspension system according to claim 17, wherein the hydropneumatic spring is connected to the side of piston displacer which does not have the piston rod.

19. A suspension system according to claim 18, wherein a throttle means is disposed in front of the floating-piston accumulator.

20. A suspension system according to claim 17, wherein a throttle means is disposed in front of the floating-piston accumulator.

21. A suspension system according to claim 17, wherein the mechanical spring is integrated into the piston displacer and rests at one end at a cylinder cover and at its other end on a separating piston which is adjacent to a piston rod-side working space.

22. A suspension system according to claim 21, wherein the separating piston and the piston of said piston displacer have a tension stop spring therebetween.

23. A suspension system according to claim 22, wherein the separation piston and the piston of said piston displacer have a stop ring therebetween which is attached at the piston rod and which acts on the separating piston or the tension stop spring beyond a certain rebound travel.

24. A suspension system according to claim 1, wherein the suspension system is partially load-bearing and is parallel-connected to a mechanical spring.

25. A suspension system according to claim 1, wherein said at least two spring means includes two first spring means for respective wheels of a vehicle axle and a second spring means which is connected in common to the first spring means.

26. A suspension system according to claim 25, wherein a throttle means is located at the input of the common second spring means.

27. A suspension system according to claim 25 or 26, wherein individual lines for the fluid medium lead from respective displacer means to the common second spring means, said lines each including a throttle means.

28. A suspension system according to claim 25, wherein the common spring means is a floating-piston accumulator, the piston of which can be displaced in opposition to the effect of a mechanical spring provided therein.

29. A suspension system according to claim 25, wherein the common spring means is a cylinder/piston unit with a piston which is supported by means of at least one mechanical spring, wherein a means for containing a flow medium associated with each respective first spring means corresponds to a respective displacer means associated with one of the two wheels.

* * * * *